US007358966B2

(12) United States Patent
Martin et al.

(10) Patent No.: US 7,358,966 B2
(45) Date of Patent: Apr. 15, 2008

(54) SELECTIVE UPDATE OF MICRO-ELECTROMECHANICAL DEVICE

(75) Inventors: Eric T. Martin, Corvallis, OR (US); Andrew L. Van Brocklin, Corvallis, OR (US); Adam L Ghozeil, Corvallis, OR (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1303 days.

(21) Appl. No.: 10/428,182

(22) Filed: Apr. 30, 2003

(65) Prior Publication Data

US 2004/0218334 A1 Nov. 4, 2004

(51) Int. Cl.
*G02B 26/00* (2006.01)

(52) U.S. Cl. ........................ 345/204; 345/84; 345/690; 310/309; 359/223; 365/293

(58) Field of Classification Search ................. 345/84, 345/204, 690; 310/309; 359/223; 365/293
See application file for complete search history.

(56) References Cited

U.S. PATENT DOCUMENTS 4,683,470 A 7/1987 Criscimagna et al.
4,695,838 A 9/1987 Ellis, Jr.
5,307,056 A 4/1994 Urbanus
6,169,532 B1 1/2001 Sumi et al.
6,286,369 B1 9/2001 Yazdi et al.
6,346,430 B1 2/2002 Raj et al.
6,388,661 B1 5/2002 Richards
6,402,968 B1 6/2002 Yazdi et al.
2002/0176648 A1 11/2002 Bhat et al.
2003/0025983 A1* 2/2003 Lasalandra et al. ......... 359/290
2003/0174376 A1 9/2003 Sane et al.
2004/0128021 A1* 7/2004 Klekotka .................... 700/204

OTHER PUBLICATIONS

IBM Disclosure Bulletin, "Microelectromechanical Transmission Light Modulator Array," Apr. 1980, pp. 5076-5077.

* cited by examiner

*Primary Examiner*—Bipin Shalwala
*Assistant Examiner*—Vincent E. Kovalick

(57) ABSTRACT

The present invention provides a data controller for controlling an electrostatically-controlled micro-electromechanical system (MEMS) device having a variable operating characteristic based on control data. The data controller comprises a data comparator and an update circuit. The data comparator is configured to receive control data of a present update cycle, to compare the control data of the present update cycle to control data of a previous update cycle on which the variable operating characteristic of the MEMS device is presently based, and to provide an update signal having a first state when the control data of the present update cycle is substantially equal to the control data of the previous update cycle. The update circuit is configured to receive the control data of the present update cycle, to receive the update signal, and to provide the control data of the present update cycle to the MEMS device, wherein the update circuit does not provide the control data of the present update cycle to the MEMS device when the update signal is in the first state.

53 Claims, 3 Drawing Sheets

SELECTIVE UPDATE OF MICRO-ELECTROMECHANICAL DEVICE

CROSS REFERENCE TO RELATED APPLICATIONS

This patent application is related to U.S. patent application Ser. No. 10/428,261 filed concurrently herewith and entitled "Optical Interference Display Device," which is herein incorporated by reference.

THE FIELD OF THE INVENTION

The present invention relates to electrostatically-controlled micro-electromechanical system (MEMS) devices, and more particularly to a scheme for selectively updating control data on which a variable operating characteristic of the MEMS device is based.

BACKGROUND OF THE INVENTION

Charge- and/or voltage-controlled micro-electromechanical system (MEMS) devices are often configured in arrays designed to perform a specific task. Examples devices utilizing MEMS arrays include light modulator arrays for displaying images, microphones, speakers, optical scanners, and accelerometers. Generally, each MEMS device of the array is provided with updated control data during each update cycle of the array. For example, data updating schemes for light modulator arrays in projection devices generally involve updating frame data in each MEMS device of the array for every frame of an image being displayed.

One control data updating scheme typically employed when the MEMS array is formed by rows and columns of individual MEMS devices involves writing control data to each of the columns (or rows) of the array and then enabling an update to all MEMS devices in a selected row (or column). This process is repeated sequentially through each row to thereby update each MEMS device of the array for a given update cycle.

Often, however, the control data for a given MEMS device of the array does not change from one update cycle to the next. For arrays that utilize charge-controlled MEMS devices, such as a light modulator array utilizing diffraction-based digital light devices (DLDs) using a variable capacitor to modulate light, each update cycle can require draining a charge based on control data of a prior update cycle from the MEMS device to place the MEMS device in a known charge state before adding an appropriate charge based on control data of a present update cycle. When employing this type of updating scheme, the MEMS device is first discharged and then recharged even when the control data, and thus the charge level, is unchanged from one update cycle to the next. Similarly, voltage-controlled MEMS devices are "re-written" with the same voltage level when the control data is unchanged from one update cycle to the next.

Updating MEMS devices with identical data from one update cycle to the next can cause undue wear on the MEMS devices that can lead to premature device failure, such as a shift in color/intensity of reflected light in a light modulating array. Furthermore, when the MEMS array is a light modulator array for displaying images, such updates can potentially produce unnecessary visual artifacts for a viewer.

SUMMARY OF THE INVENTION

One aspect of the present invention provides a data controller for controlling an electrostatically-controlled micro-electromechanical system (MEMS) device having a variable operating characteristic based on control data. The data controller comprises a data comparator and an update circuit. The data comparator is configured to receive control data of a present update cycle, to compare the control data of the present update cycle to control data of a previous update cycle on which the variable operating characteristic of the MEMS device is presently based, and to provide an update signal having a first state when the control data of the present update cycle is substantially equal to the control data of the previous update cycle. The update circuit is configured to receive the control data of the present update cycle, to receive the update signal, and to provide the control data of the present update cycle to the MEMS device, wherein the update circuit does not provide the control data of the present update cycle to the MEMS device when the update signal is in the first state.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
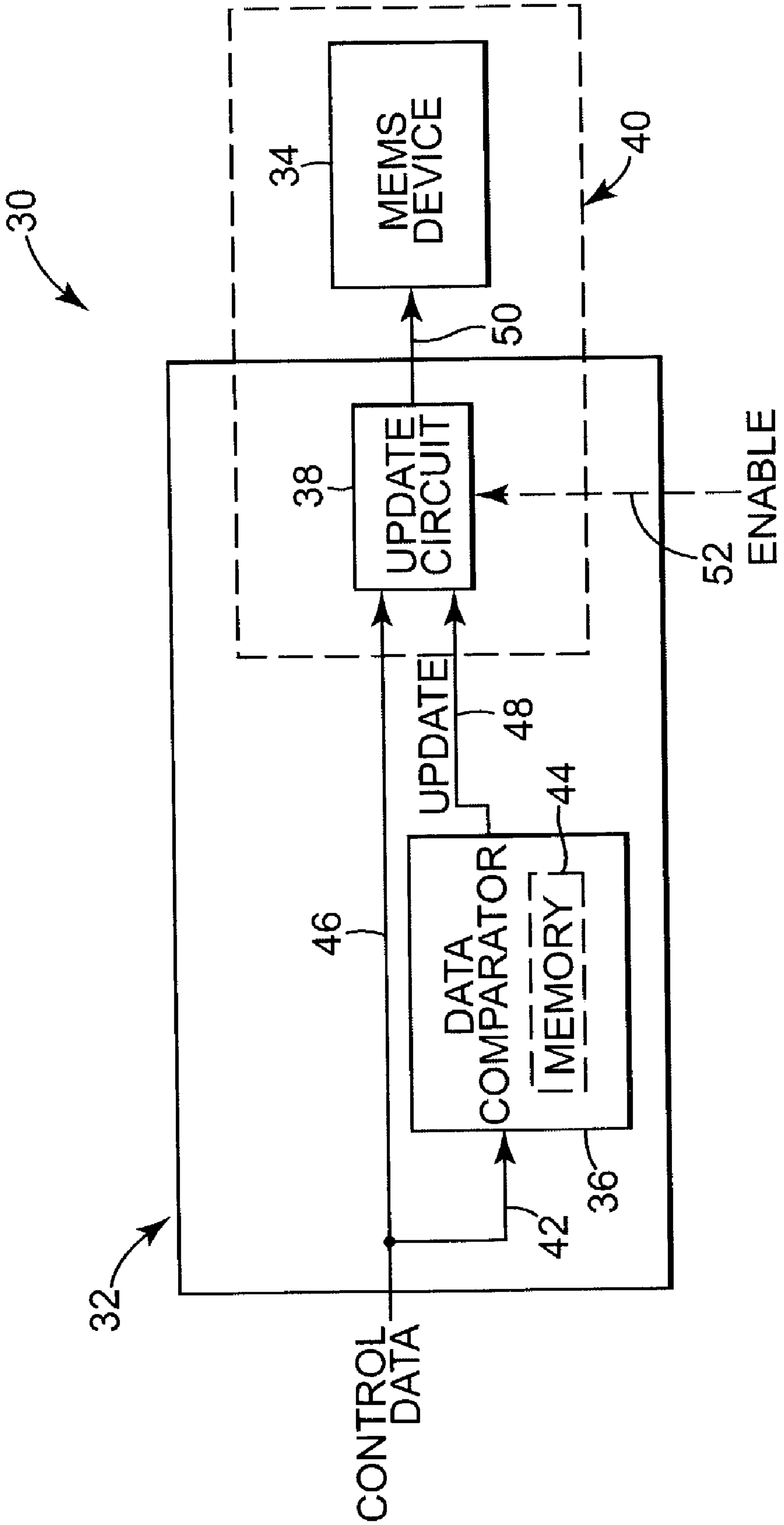
FIG. 1 is a diagram illustrating an exemplary embodiment of a micro-electromechanical system according to the present invention.

FIG. 1 is a block diagram illustrating an exemplary embodiment of a micro-electromechanical system 30 according to the present invention. Micro-electromechanical system 30 includes a data controller 32 and an electrostatically controlled micro-electromechanical system (MEMS) device 34 having a variable operating characteristic that is varied as necessary based on control data to thereby perform a desired task. Data controller 32 further includes a data comparator 36 and an update circuit 38. In one embodiment, MEMS device 34 and update circuit 38 are combined to form a micro-electromechanical cell 40.

Data comparator 36 is configured to receive control data of a present update cycle via a path 42. Data comparator 36 compares the control data of the present update cycle to control data of a previous update cycle on which the variable operating characteristic of the MEMS device is presently based, and provides an update signal having a first state when the control data of the present update cycle is substantially equal to the control data of the previous update cycle and a second state when the control data of the present update cycle is not substantially equal to the control data of the previous update cycle.

In one embodiment, the control data of the present update cycle is substantially equal to the control data of the previous update cycle when the control data of the present update cycle is within a predetermined range of the control data of the previous update cycle. In one embodiment, data comparator 36 further includes a memory 44 that stores the control data of the previous update cycle on which the variable operating characteristic of the MEMS device is presently based. In one embodiment, the control data of the previous update cycle on which the variable operating characteristic is presently based is replaced with the control data of the present update cycle when the control data of the present update cycle is not substantially equal to the control data of the previous cycle on which the variable operating characteristic presently based.

Update circuit 38 receives the control data for the present update cycle via a path 46, the update signal via a path 48, and is configured to provide the control data of the present update cycle to MEMS device 34 via a path 50 to thereby update MEMS device 34 so that the variable operating characteristic is based on the control data of the present update cycle. Update circuit 38 does not provide the control data of the present update cycle to MEMS device 34 when the update signal has the first state, so that the variable operating characteristic of MEMS devices 34 continues to be based on the control data of the previous update cycle.

In one embodiment, update circuit 38 further receives an enable signal via a path 52 indicative of when MEMS device 34 is to be updated with the control data of the present update cycle. Per this embodiment, update circuit 38 does not provide the control data of the present update cycle to MEMS device 34 when the update signal has the first state or the enable signal indicates that MEMS device 34 is not to be updated.

By employing data controller 32 to selectively update MEMS device 34 with control data, such that MEMS device 34 is not updated with the control data of a present update cycle when it is substantially equal to the control of a previous update cycle on which the variable operating characteristic is presently based, micro-electromechanical system 30 reduces the number of types MEMS device 30 is updated. As a result, MEMS device 34 will experience less operating wear, resulting in both an increase in the expected operating life and improved performance stability over time of MEMS device 34.

In one embodiment, micro-electromechanical system 30 is a display system for modulating light. In this embodiment, MEMS device 34 is a charge-controlled MEMS device configured to modulate light to display, at least partially, a pixel of a displayable image based on a stored charge, wherein the stored charge is based on frame data of the displayable image received via path 42. In one embodiment, light modulating device 34 is a diffraction-based digital light device (DLD) as disclosed by the above U.S. patent application Ser. No. 10/428,261 filed concurrently herewith and entitled "Optical Interference Display Device." In one embodiment, light modulating device 34 and update circuit 38 together form a light modulating cell 40.

Data comparator 36 is configured to receive frame data for a present frame of the displayable image via a path 42 while MEMS device 34 has a presently stored charge based on frame data of a previous frame of the displayable image. Data comparator 36 compares the frame data of the present frame to the frame data of the previous frame on which the presently stored charge is based, and provides an update signal having a first state when the frame data of the present frame is substantially equal to the frame data of the previous frame and a second state when the frame data of the present frame is not substantially equal to the frame data of the previous frame. In one embodiment, the frame data is a voltage signal having a level that is applied to MEMS device 34 to modify the stored charge.

In one embodiment, the frame data of the present frame is substantially equal to the frame data of the previous frame when the frame data of the present frame is within a predetermined range of the frame data of the previous frame. In one embodiment, data comparator 36 further includes a memory 44 that stores the frame data of the previous frame on which the stored charge of MEMS device 34 is presently based. In one embodiment, the frame data of the previous frame on which the stored charge is presently based is replaced with the frame data of the present frame when the frame data of the present frame is not substantially equal to the frame data of the previous frame on which the stored charge is presently based.

Update circuit 38 receives the frame data for the present frame via a path 46, the update signal via a path 48, and is configured to provide the frame data of the present frame to MEMS device 34 via a path 50 to thereby update MEMS device 34 so that the stored charge is based on the frame data of the present frame. Update circuit 38 does not provide the frame data of the present frame to MEMS device 34 when the update signal has the first state, so that the stored charge of MEMS devices 34 continues to be based on the frame data of the previous frame.

In one embodiment, update circuit 38 further receives an enable signal via a path 52 indicative of when MEMS device 34 is to be updated with the frame data of the present frame. Per this embodiment, update circuit 38 does not provide the frame data of the present frame to MEMS device 34 when the update signal has the first state or the enable signal indicates that MEMS device 34 is not to be updated.

By employing data controller 32 to selectively update light modulating MEMS device 34, such that MEMS device 34 is not updated with the frame data of a present frame when it is substantially equal to frame data of a previous frame on which the store charge is presently based, light modulating system 30 reduces the potential for visual artifacts. Additionally, light modulating MEMS device 34 will also be updated less frequently. Thus, light modulating system 30 also reduces the operating wear of light modulating MEMS device 34, resulting in both an increase in the expected operating life and improved performance stability over time of light modulating MEMS device 34.

Figure 2:
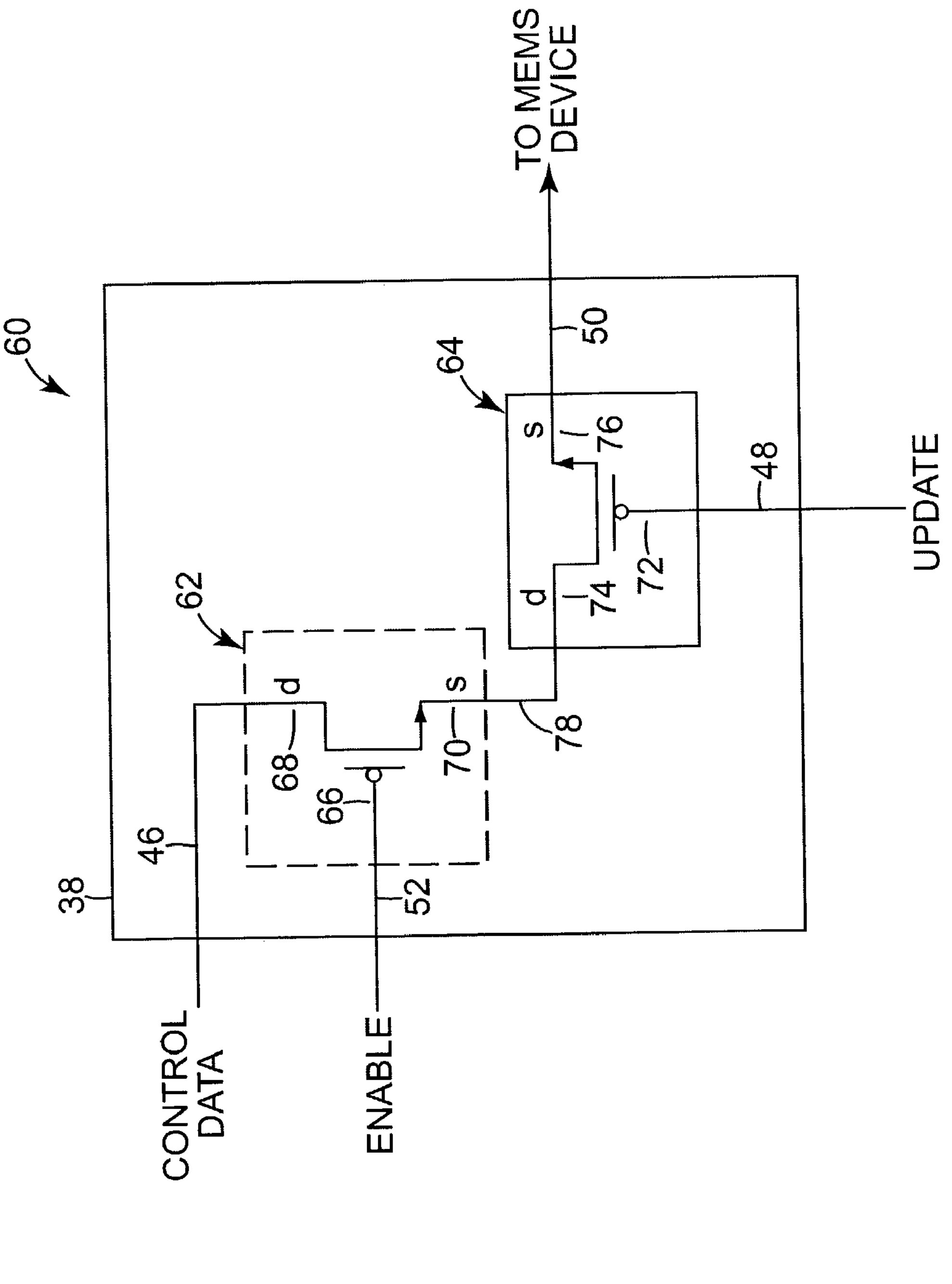
FIG. 2 is a schematic diagram illustrating an exemplary embodiment of a charge control circuit.

FIG. 2 is a schematic diagram 60 illustrating one embodiment of update circuit 38 according to the present invention. Update circuit 38 includes a first switch 62 and a second switch 64. In one embodiment, first switch 62 is a p-channel metal-oxide-semiconductor (PMOS) device having a gate 66, a drain 68, and a source 70. In one embodiment, second switch 64 is an PMOS device having a gate 72, a drain 74, and a source 76.

First switch 62 receives the control data for the present update cycle at drain 68 via path 46 and the enable signal at gate 66 via path 52. Source 70 is coupled to drain 74 of switch 64 via a path 78. Second switch 64 is configured to receive the control data from first switch 62 at drain 74 via path 78, to receive the update signal at gate 72 via path 48, and is configured to provide at source 76 the control data to MEMS device 34 via path 50.

Update circuit 38 is configured to provide the control data of the present update cycle to MEMS device 34 as described below. When the enable signal is at a "low" level, indicating that MEMS device 34 is to be updated with the control data of the present update cycle, PMOS device 62 is turned-on and provides the control data to PMOS device 64 via path 78. When the enable signal is a "high" level, PMOS device 64 is turned-off and prevents the transfer of the control data of the present update cycle to PMOS device 64, and thus to MEMS device 34 as well.

When the control data of the present update cycle is not substantially equal to the control data on which the variable operating characteristic of MEMS device 34 is presently based, the update signal is at a "low" level causing PMOS device 64 to turn-on and provide the control data of the present update cycle to MEMS device 34 when PMOS device 62 is also turned-on. When the control data of the present update cycle is substantially equal to the control data of a previous update cycle on which the variable operating characteristic of MEMS device 34 is presently based, the update signal is at a "high" level causing PMOS device 64 to be turned-off, thereby preventing the transfer of the control data of the present update cycle to MEMS device 34 via path 50 regardless of whether PMOS device 62 is turned-on or -off.

Thus, update circuit 38 provides the control data of the present update cycle to MEMS device 34 only when the enable signal indicates that MEMS device 34 is to be updated with the control data of the present update cycle and when the control data of the present update cycle is not substantially equal to the control data on which the variable operating characteristic of MEMS device 34 is presently based.

Figure 3:
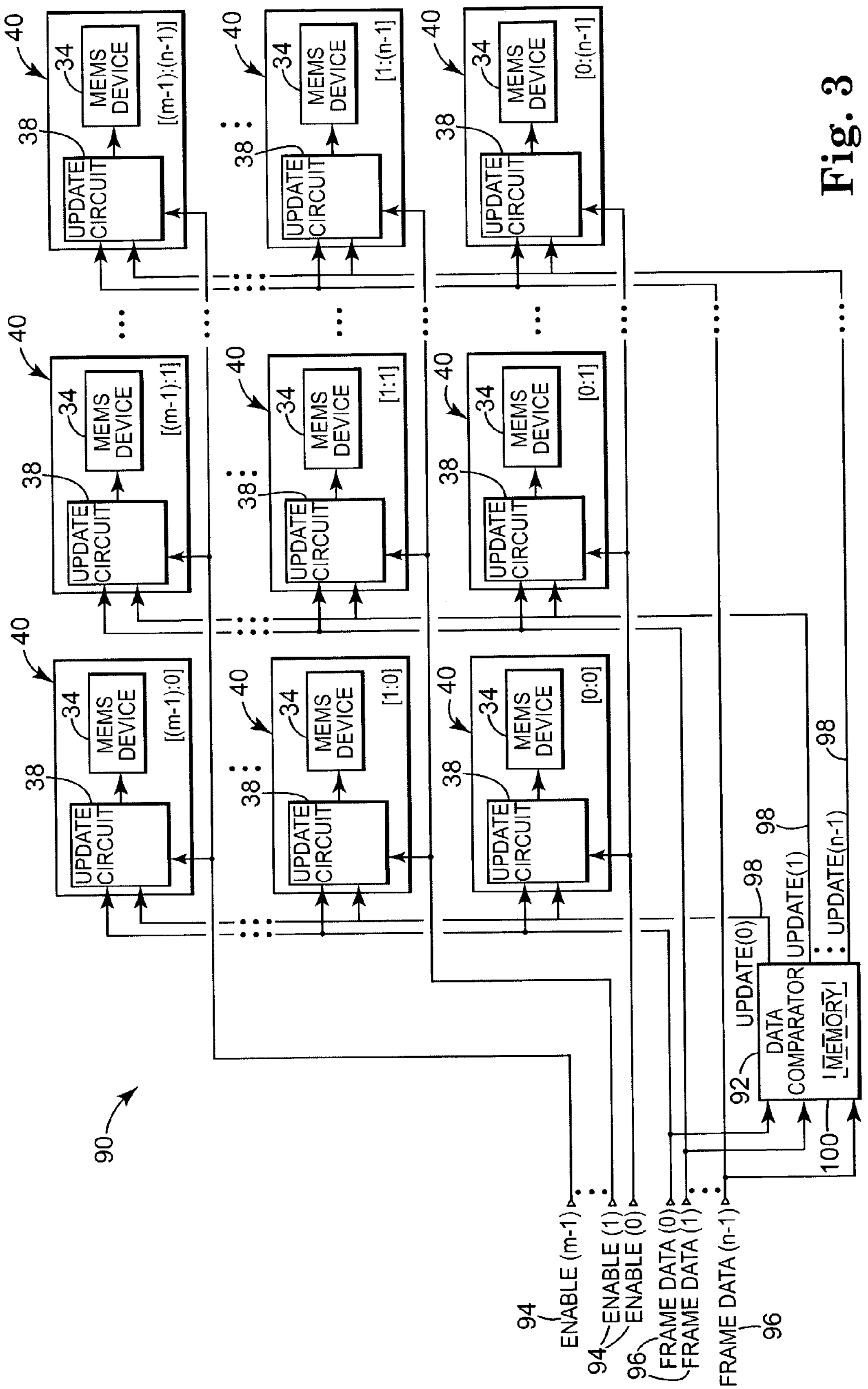
FIG. 3 is a diagram illustrating an exemplary embodiment of a light modulating array according to the present invention.

FIG. 3 is a block diagram illustrating an exemplary embodiment of a light modulating array 90 according to the present invention. Light modulating array 90 comprises an M-row by N-column array of light modulating cells 40, and a data comparator 92. Each light modulating cell 40 of the array further comprises a charge-controlled light modulating MEMS device 34 and an update circuit 38. Each light modulating cell 40 is configured to display, at least partially, a pixel of a displayable image based on a stored charge, wherein the stored charge is based on frame data of the displayable image.

Each row of the M rows of the array receives a separate enable signal 94 for a total of M enable signals, with all update circuits 38 of a given row receiving the same enable signal. Each column of the N columns of the array receives a separate frame data signal 96 comprising frame data of a present frame of the displayable image, for a total of N frame data signals. In one embodiment, the frame data signal is a voltage signal having a level that is applied to MEMS device 34 to modify the stored charge to thereby modify optical properties of MEMS device 34. Data comparator 92 receives the N frame data signals for the present frame of the displayable image and provides N update signals, one to each column of the array.

Light modulating array 90 is updated from frame-to-frame of the displayable image to reflect changes in the displayable image. In one embodiment, light modulating array 90 is updated in a row-wise fashion. According to this scheme, frame data for a present frame of the displayable image is provided to each of the N columns of the array via frame data signal "0" through "(n−1)" as indicated at 96. An enable signal having a first state is then provided to a given row of the array that is the first of the M rows to be updated, wherein the first state indicates that each of the MEMS devices 34 of the given row is to be updated with the associated frame data of the present frame. In other words, the enable signal enables the given row to be updated. In one embodiment, the light modulating array 90 is updated in a sequential fashion, beginning with row "0" and ending with row "(m−1)," wherein enable signal "0" is the first to be provided at the first state.

Data comparator 92 compares the frame data of each of the N frame data signals of the present frame to the frame data of the previous frame data signal on which the stored charge of the corresponding MEMS device 34 of the enabled row is presently based. Data comparator 92 then provides N update signals, one to each of the N columns. If the frame data of the present frame for a given column is substantially equal to the frame data of the previous frame on which the stored charge of the corresponding MEMS device 34 is presently based, data comparator provides an update signal having the first state. If the frame data of the present frame for a given column is not substantially equal to the frame data of the previous frame on which the stored charge of the corresponding MEMS device 34 is presently based, data comparator 92 provides an update signal having the second state.

When the update signal for the given column has the first state, the update circuit of the light modulating cell 40 of the enabled row does not provide the frame data of the present frame to the corresponding MEMS device 34 so that the stored charge of MEMS devices 34 continues to be based on the frame data of the previous frame. When the update signal for the given column has the second state, the update circuit of the light modulating cell 40 of the enabled row provides the frame data of the present frame to the corresponding MEMS device 34 so that the stored charge of MEMS devices 34 is updated to thereby be based on the frame data of the present frame. Thus, for a given row that is enabled, only the MEMS devices 34 of the light modulating cells 40 where the frame data of the present frame is not substantially equal to the frame data on which the stored charge of the MEMS device is presently based are updated with the frame data of the present frame of the displayable image. This process is then repeated until frame data of the present frame of the displayable image has been applied to each of the N rows of light modulating array 90.

By selectively updating only the MEMS devices 34 of those light modulating cells 40 where the frame data of a present frame is not substantially equal to frame data of a previous frame on which the stored charge of the MEMS device 34 is presently based, light modulating array 90 reduces the potential for visual artifacts. Additionally, light modulating MEMS devices 34 will also be updated less frequently. Thus, light modulating array 90 also reduces the operating wear of light modulating MEMS device 34, resulting in both an increase in the expected operating life and improved performance stability over time of light modulating MEMS device 34.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A data controller for controlling an electrostatically-controlled micro-electromechanical system (MEMS) device having a variable operating characteristic based on control data, the data controller comprising:

a data comparator configured to receive control data of a present update cycle, to compare the control data of the present update cycle to control data of a previous update cycle on which the variable operating characteristic of the MEMS device is presently based, and to provide an update signal having a first state when the control data of the present update cycle is substantially equal to the control data of the previous update cycle; and an update circuit configured to receive the control data of the present update cycle, to receive the update signal, and to provide the control data of the present update cycle to the MEMS device, wherein the update circuit does not provide the control data of the present update cycle to the MEMS device when the update signal is in the first state.

2. The data controller of claim 1, wherein the data comparator further comprises:

a memory for storing the control data of the previous update cycle on which the presently stored charge of the MEMS device is based.

3. The data controller of claim 2, wherein the control data of the previous update cycle stored in the memory is replaced with the control data of the present update cycle when the control data of the present update cycle is not substantially equal to the control data of the previous update cycle.

4. The data controller of claim 1, wherein the data comparator is configured to provide an update signal having the first state when the control data of the present update cycle is within a range of the control data of the previous update cycle.

5. The data controller of claim 1, wherein the update circuit is further configured to receive a an enable signal having a first state indicative of when the control data of the present update cycle is to be provided to the MEMS device and a second state indicative of when the control data of the present update cycle is not to be provided to the MEMS device, wherein the update circuit does not provide the control data of the present cycle to the MEMS device when the enable signal has the second state.

6. The data controller of claim 5, wherein the update circuit comprises:

a first switch configured to receive the control data and the enable signal, and to provide the control data, wherein the first switch does not provide the control data when the enable signal has the second state; and a second switch configured to receive the control data from the first switch and the update signal, and to provide the control data to the MEMS device, wherein the second switch does not provide the control data to the MEMS device when the update signal has the first state.

7. The data controller of claim 6, wherein the first switch comprises:

a p-channel metal-oxide semiconductor (PMOS) device having a gate configured to receive the enable signal, a drain configured to receive the control data, and a source configured to provide the control data.

8. The data controller of claim 6, wherein the second switch comprises:

a p-channel metal-oxide semiconductor (PMOS) device having a gate configured to receive the update signal, a drain configured to receive the control data from the first switch, and a source configured to provide the control data to the MEMS device.

9. A micro-electromechanical system comprising:

an electrostatically-controlled micro-electromechanical system (MEMS) device having a variable operating characteristic based on control data; and a data controller comprising:

a data comparator configured to receive control data of a present update cycle, to compare the control data of the present update cycle to control data of a previous update cycle on which the variable operating characteristic of the MEMS device is presently based, and to provide an update signal having a first state when the control data of the present update cycle is substantially equal to the control data of the previous update cycle; and an update circuit configured to receive the control data of the present update cycle, to receive the update signal, and to provide the control data of the present update cycle to the MEMS device, wherein the update circuit does not provide the control data of the present update cycle to the MEMS device when the update signal is in the first state.

10. The micro-electromechanical system of claim 9, wherein the data comparator further comprises:

a memory for storing the control data of the previous update cycle on which the variable operating characteristic of the MEMS device is presently based.

11. The micro-electromechanical system of claim 10, wherein the control data of the previous update cycle stored in the memory is replaced with the control data of the present update cycle when the control data of the present update cycle is not substantially equal to the control data of the previous update cycle.

12. The micro-electromechanical system of claim 9, wherein the data comparator is configured to provide an update signal having the first state when the control data of the present update cycle is within a range of the control data of the previous update cycle.

13. The micro-electromechanical system of claim 9, wherein the update circuit is further configured to receive a an enable signal having a first state indicative of when the control data of the present update cycle is to be provided to the MEMS device and a second state indicative of when the control data of the present update cycle is not to be provided to the MEMS device, wherein the update circuit does not provide the control data of the present cycle to the MEMS device when the enable signal has the second state.

14. The micro-electromechanical system of claim 13, wherein the update circuit comprises:

a first switch configured to receive the control data and the enable signal, and to provide the control data, wherein the first switch does not provide the control data when the enable signal has the second state; and a second switch configured to receive the control data from the first switch and the update signal, wherein the second switch does not provide the control data to the MEMS device when the update signal has the first state.

15. The micro-electromechanical system of claim 14, wherein the first switch comprises:

a p-channel metal-oxide semiconductor (PMOS) device having a gate configured to receive the enable signal, a drain configured to receive the control data, and a source configured to provide the control data.

16. The micro-electromechanical system of claim 14, wherein the second switch comprises:

a p-channel metal-oxide semiconductor (PMOS) device having a gate configured to receive the update signal, a drain configured to receive the control data from the first switch, and a source configured to provide the control data to the MEMS device.

17. The micro-electromechanical system of claim 9, wherein the update circuit and the MEMS device together form a micro-electromechanical cell.

18. The micro-electromechanical system of claim 9, wherein the MEMS device comprises:

a charge-controlled MEMS device configured to modulate light to display, at least partially, a pixel of a displayable image.

19. The micro-electromechanical system of claim 18, wherein the variable operating characteristic comprises:

a stored charge on a variable capacitor.

20. The micro-electromechanical system of claim 18, wherein the control data comprises:

frame data representative of the displayable image.

21. The micro-electromechanical system of claim 18, wherein the MEMS device and update circuit together form a light modulating cell.

22. A light modulating system comprising:

a charge-controlled micro-electromechanical system (MEMS) device configured to modulate light based on a stored charge on a variable capacitor to display, at least partially, a pixel of a displayable image, wherein the stored charge is based on frame data representative of the displayable image; and a data controller comprising:

a data comparator configured to receive frame data of a present frame, to compare the frame data of the present frame to frame data of a previous frame on which a presently stored charge of the MEMS device is based, and to provide an update signal having a first state when the frame data of the present frame is substantially equal to the frame data of the previous frame; and an update circuit configured to receive the frame data of the present frame, to receive the update signal, and to provide the frame data of the present frame to the MEMS device, wherein the update circuit does not provide the frame data of the present frame to the MEMS device when the update signal is in the first state.

23. The light modulating system of claim 22, wherein the data comparator further comprises:

a memory for storing the frame data of the previous update cycle on which the presently stored charge of the MEMS device is based.

24. The light modulating system of claim 23, wherein the frame data of the previous update cycle stored in the memory is replaced with the frame data of the present frame when the control data of the present frame is not substantially equal to the frame data of the previous frame.

25. The light modulating system of claim 22, wherein the data comparator is configured to provide an update signal having the first state when the frame data of the present frame is within a range of the frame data of the previous frame.

26. The light modulating system of claim 22, wherein the update circuit is further configured to receive a an enable signal having a first state indicative of when the frame data of the present frame is to be provided to the MEMS device and a second state indicative of when the frame data of the present frame is not to be provided to the MEMS device, wherein the update circuit does not provide the frame data of the present frame to the MEMS device when the enable signal has the second state.

27. The light modulating system of claim 26, wherein the update circuit comprises:

a first switch configured to receive the frame data of the present frame and the enable signal, and to provide the frame data of the present frame, wherein the first switch does not provide the frame data of the present frame when the enable signal has the second state; and a second switch configured to receive the frame data of the present frame from the first switch, to receive the update signal, and to provide the frame data of the present frame to the MEMS device, wherein the second switch does not provide the frame data of the present frame to the MEMS device when the update signal has the first state.

28. The light modulating system of claim 27, wherein the first switch comprises:

a p-channel metal-oxide semiconductor (PMOS) device having a gate configured to receive the enable signal, a drain configured to receive the frame data of the present frame, and a source configured to provide the frame data of the present frame.

29. The light modulating system of claim 27, wherein the second switch comprises:

a p-channel metal-oxide semiconductor (PMOS) device having a gate configured to receive the update signal, a drain configured to receive the frame data of the present frame from the first switch, and a source configured to provide the frame data of the present frame to the MEMS device.

30. The light modulating system of claim 22, wherein in the update circuit and the MEMS device together form a light modulating cell.

31. A micro-electromechanical system comprising:

an M-row by N-column array of micro-electromechanical cells configured to perform a task, each cell comprising:

an electrostatically-controlled micro-electromechanical system (MEMS) device having a variable operating characteristic based on control data; and an update circuit configured to receive control data of a present update cycle, to receive an update signal, and to provide the control data of the present update cycle to the MEMS device, wherein the update circuit does not provide the control data of the present update cycle to the MEMS device when the update signal has a first state; and a data comparator configured to compare for each cell of the array the control data of the present update cycle to frame data of a previous update cycle on which the variable operating characteristic of the cell is presently based, and to provide to each cell of the array the update signal having a first state when the control data of the present update cycle is substantially equal to the control data of the previous update cycle on which the variable operating characteristic is presently based.

32. The micro-electromechanical system of claim 31, wherein the data comparator further comprises:

a memory for storing for each micro-electromechanical cell of the array the control data of the previous update cycle on which the variable operating characteristic of the MEMS device is presently based.

33. The micro-electromechanical system of claim 32, wherein for each micro-electromechanical cell the control data of the previous update cycle stored in the memory is replaced with the control data of the present update cycle when the control data of the present update cycle is not substantially equal to the control data of the previous update cycle.

34. The micro-electromechanical system of claim 31, wherein the data comparator is configured to provide an update signal having the first state when the control data of the present update cycle is within a range of the control data of the previous update cycle on which the variable operating characteristic of the MEMS device is presently based.

35. The micro-electromechanical system of claim 31, wherein the update circuit is further configured to receive a an enable signal having a first state indicative of when the control data of the present update cycle is to be provided to the MEMS device and a second state indicative of when the control data of the present update cycle is not to be provided to the MEMS device, wherein the update circuit does not provide the control data of the present update cycle to the MEMS device when the enable signal has the second state.

36. The micro-electromechanical system of claim 35, wherein the update circuit comprises:

a first switch configured to receive the control data of the present update cycle and the enable signal, and to provide the control data, wherein the first switch does not provide the control data when the enable signal has the second state; and a second switch configured to receive the control data from the first switch and the update signal, and to provide the control data to the MEMS device, wherein the second switch does not provide the control data to the MEMS device when the update signal has the first state.

37. The micro-electromechanical system of claim 36, wherein the first switch comprises:

a p-channel metal-oxide semiconductor (PMOS) device having a gate configured to receive the enable signal, a drain configured to receive the control data, and a source configured to provide the control data.

38. The micro-electromechanical system of claim 36, wherein the second switch comprises:

a p-channel metal-oxide semiconductor (PMOS) device having a gate configured to receive the update signal, a drain configured to receive the control data from the first switch, and a source configured to provide the control data to the MEMS device.

39. A light modulating system for displaying an image, the system comprising:

an M-row by N-column array of light modulating cells, each cell comprising:

a charge-controlled micro-electromechanical system (MEMS) device configured to modulate light based on a stored charge to display, at least partially, a pixel of the image, wherein the stored charge is based on frame data representative of the image; and an update circuit configured to receive frame data of a present frame, to receive an update signal, and to provide the frame data of the present frame to the MEMS device, wherein the update circuit does not provide the frame data of the present frame to the MEMS device when the update signal has a first state; and a data comparator configured to compare for each cell of the array the frame data of the present frame data to frame data of a previous frame on which a presently stored charge of the cell is based, and to provide to each cell of the array the update signal having a first state when the frame data of the present frame is substantially equal to the frame data of the previous frame on which the presently stored charge is based.

40. The light modulating system of claim 39, wherein the data comparator further comprises:

a memory for storing for each light modulating cell of the array the frame data of the previous frame on which the presently stored charge of the MEMS device is based.

41. The light modulating system of claim 40, wherein for each light modulating cell the frame data of the previous frame stored in the memory is replaced with the frame data of the present frame when the frame data of the present frame is not substantially equal to the frame data of the previous update cycle.

42. The light modulating system of claim 39, wherein the data comparator is configured to provide an update signal having the first state when the frame data of the present frame is within a range of the frame data of the previous frame on which the presently stored charge of the MEMS device is based.

43. The light modulating system of claim 39, wherein the update circuit is further configured to receive a an enable signal having a first state indicative of when the frame data of the present frame is to be provided to the MEMS device and a second state indicative of when the frame data of the present frame is not to be provided to the MEMS device, wherein the update circuit does not provide the frame data of the present frame to the MEMS device when the enable signal has the second state.

44. The light modulating system of claim 43, wherein the update circuit comprises:

a first switch configured to receive the frame data of the present frame and the enable signal, and to provide the frame data, wherein the first switch does not provide the frame data when the enable signal has the second state; and a second switch configured to receive the frame data from the first switch and the update signal, and to provide the frame data to the MEMS device, wherein the second switch does not provide the frame data to the MEMS device when the update signal has the first state.

45. The light modulating system of claim 44, wherein the first switch comprises:

a p-channel metal-oxide semiconductor (PMOS) device having a gate configured to receive the enable signal, a drain configured to receive the frame data, and a source configured to provide the frame data.

46. The light modulating system of claim 44, wherein the second switch comprises:

a p-channel metal-oxide semiconductor (PMOS) device having a gate configured to receive the update signal, a drain configured to receive the frame data from the first switch, and a source configured to provide the frame data to the MEMS device.

47. A method of updating control data for an electrostatically-controlled micro-electromechanical system (MEMS) device having a variable operating characteristic based on the control data, the method comprising:

receiving control data of a present update cycle;

comparing the control data of a present update cycle to control data of a previous update cycle on which the variable operating characteristic of the MEMS device is presently based; and updating the MEMS device with the control data of the present update cycle only when the control data of the present update cycle is not substantially equal to the control data of the previous update cycle on which the variable operating characteristic of the MEMS device is presently based such that the variable operating characteristic of the MEMS device is modified to reflect the control data of the present update cycle.

48. The method of claim 47, further comprising:

storing in a memory the control data of the previous update cycle on which the variable operating characteristic of the MEMS device is presently based.

49. The method of claim 48, further comprising:

replacing the control data of the previous update cycle stored in the memory with the control data of the present update cycle when the control data of the present update cycle is not substantially equal to the control data of the previous update cycle stored in the memory.

50. The method of claim 47, further comprising:

receiving an enable signal indicative of when the control data of the present update cycle is to be provided to the MEMS device; and updating the MEMS device with the control data of the present update cycle only when the enable signal indicates that the MEMS device is to be updated with the control data of the present update cycle and when the control data of the present update cycle is not substantially equal to the control data of the previous update cycle on which the variable operating characteristic of the MEMS device is presently based.

51. A data controller for controlling an electrostatically-controlled micro-electromechanical system (MEMS) device having a variable operating characteristic based on control data, the data controller comprising:

means for receiving and comparing control data of a present update cycle to control data of a previous update cycle on which the variable operating characteristic is presently based and for providing an update signal having a first state when the control data of the present update cycle is substantially equal to the control data of the previous cycle on which the variable operating characteristic is presently based; and means for receiving the update signal and for providing the control data of the present update cycle to the MEMS device, wherein the control data of the present update cycle is not provided to the MEMS device with the update signal has the first state.

52. The data controller of claim 51, further comprising:

means for storing the control data of the previous update cycle on which the variable operating characteristic of the MEMS device is presently based.

53. The data controller of claim 52, further comprising:

means for replacing the stored control data of the previous update cycle with the control data of the present update cycle when the control data of the present update cycle is not substantially equal to the control data of the previous update cycle stored in the memory.

* * * * *